(12) United States Patent
Yoshimura et al.

(10) Patent No.: US 7,144,235 B2
(45) Date of Patent: Dec. 5, 2006

(54) BEARING AND SCREW COMPRESSOR

(75) Inventors: Shoji Yoshimura, Takasago (JP); Takao Ohama, Takasago (JP); Yasushi Amano, Takasago (JP)

(73) Assignee: Kobe Steel, Ltd., Kobe (JP)

( * ) Notice: Subject to any disclaimer, the term of this patent is extended or adjusted under 35 U.S.C. 154(b) by 240 days.

(21) Appl. No.: 10/861,462

(22) Filed: Jun. 7, 2004

(65) Prior Publication Data

US 2005/0018936 A1    Jan. 27, 2005

(30) Foreign Application Priority Data

Jun. 6, 2003    (JP) .............................. 2003-162452

(51) Int. Cl.
  *F01C 1/16*    (2006.01)
(52) U.S. Cl. ................... 418/201.1; 418/202; 384/299; 384/912
(58) Field of Classification Search ............. 418/201.1, 418/202, 203, 179; 384/299, 624, 909, 912
  See application file for complete search history.

(56) References Cited

U.S. PATENT DOCUMENTS 4,613,289 A * 9/1986 Kotera ........................ 417/420
4,623,590 A * 11/1986 Hodes et al. ................ 428/408
4,668,550 A * 5/1987 Tajima et al. .............. 428/65.1
5,629,082 A   5/1997 Baureis et al.
6,059,551 A * 5/2000 Amano et al. ................ 418/84
6,640,690 B1 * 11/2003 Sugiura et al. ................ 92/71

FOREIGN PATENT DOCUMENTS

| JP | 2000-145785 | * | 5/2000 |
| JP | 2000-192961 | | 7/2000 |
| JP | 2002-194380 | | 7/2002 |

* cited by examiner

*Primary Examiner*—Hoang Nguyen
(74) *Attorney, Agent, or Firm*—Oblon, Spivak, McClelland, Maier & Neustadt, P.C.

(57) ABSTRACT

A bearing comprising a resin layer, a backing strip and an intermediate layer which bonds the resin layer and the backing strip to each other is disclosed. The bearing undergoes a force from the resin layer side. A corrosion preventing layer is formed on each side face of the bearing so as to cover the intermediate layer. The corrosion preventing layer prevents the intermediate layer from being corroded by gas contained in an atmosphere and lubricating oil which are present around the bearing.

21 Claims, 6 Drawing Sheets

BEARING AND SCREW COMPRESSOR

BACKGROUND OF THE INVENTION

1. Field of the Invention

The present invention relates to a bearing and a screw compressor. Particularly, the present invention is concerned with a bearing superior in corrosion resistance and a screw compressor having the bearing superior in corrosion resistance.

2. Description of the Related Art

As known well, a screw compressor has a casing for housing therein a pair of female and male screw rotors meshed with each other. End portions of rotor shafts of each of the pair of screw rotors are supported by radial bearings. On the other hand, a pair of thrust bearings for bearing a thrust force developed on the screw rotor are mounted at one end of a rotor shaft, in each of the pair of female and male screw rotors. The thrust bearings are disposed on both sides of a disc-like thrust member fitted on the one end of the rotor shaft in each of the pair of screw rotors. The thrust bearings are in sliding contact with a slide surface of the thrust member to bear a thrust force transmitted from the screw rotor to the thrust member. In the screw compressor of the above construction, since the screw rotors are rotated at high speed, plain bearings are used as the radial bearings and the thrust bearings. Since slide portions of the bearings are required to be low in friction, a low friction material is used for particularly slide portions of the thrust bearings which receive a thrust force from the thrust members of a high peripheral velocity.

As a thrust bearing using a low friction material for its slide portion, one constituted for example by a plural-layer slide member is known. In this plural-layer slide member, a porous intermediate layer is formed between a metallic backing strip difficult to bond and a resin layer as a slide member to let an anchoring effect be exhibited, thereby enhancing the bonding force between the metal and the resin layer to make the resin layer difficult to be peeled and improve the abrasion resistance and sliding characteristic of the resin layer. The bearing constituted by the plural-layer slide member is disclosed, for example, in Japanese Patent Laid Open publication No. 2002-194380.

The above plural-layer slide member is difficult to peel from the backing strip and is superior in both abrasion resistance and sliding characteristic, so is considered suitable as a constituent material of a thrust bearing.

If a thrust bearing constituted by such a plural-layer slide member is used for example on a rotor shaft of a screw rotor in a screw compressor, gas contained in an atmosphere, i.e., suction gas, and lubricating oil get in around the thrust bearing, so that the thrust bearing comes into contact with the gas and the lubricating oil. In this case, if a corrosive component, e.g., ammonia, which corrodes components of the thrust bearing is contained in the gas or the lubricating oil, the porous intermediate layer, which contains copper, will be corroded, with consequent damage of the thrust bearing, thus requiring a frequent repair of the screw compressor. As a result, not only the rate of operation of the screw compressor becomes lower, but also the cost for maintenance of the screw compressor becomes higher.

SUMMARY OF THE INVENTION

It is an object of the present invention to provide a bearing capable of preventing the corrosion of an intermediate layer even if a corrosive component is contained in gas or lubricating oil, as well as a screw compressor having the bearing.

DETAILED DESCRIPTION OF THE PREFERRED EMBODIMENTS

Figure 1:
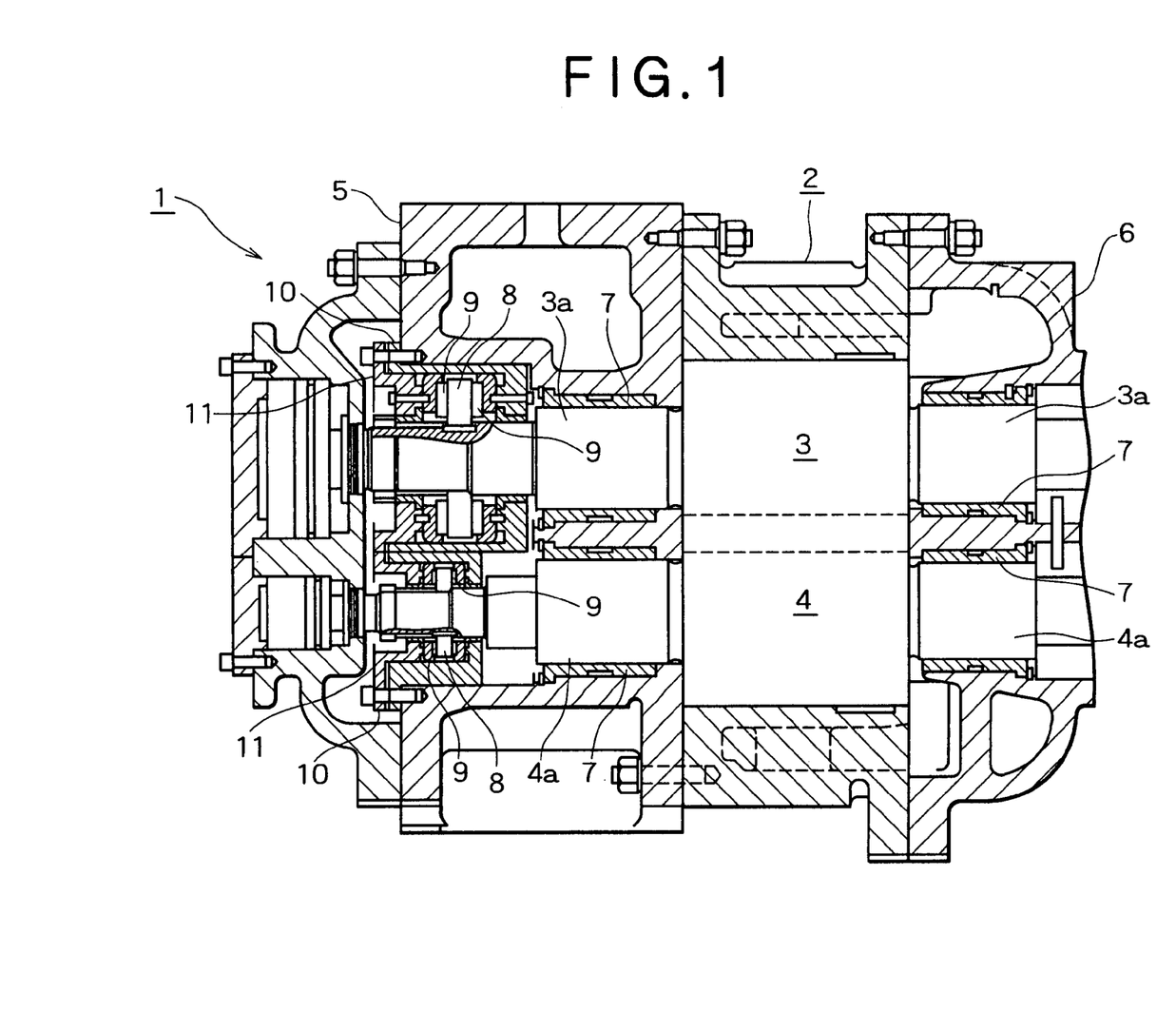
FIG. 1 is a sectional view of a principal portion, showing the construction of bearings used in a screw compressor according to the present invention.
Figure 2:
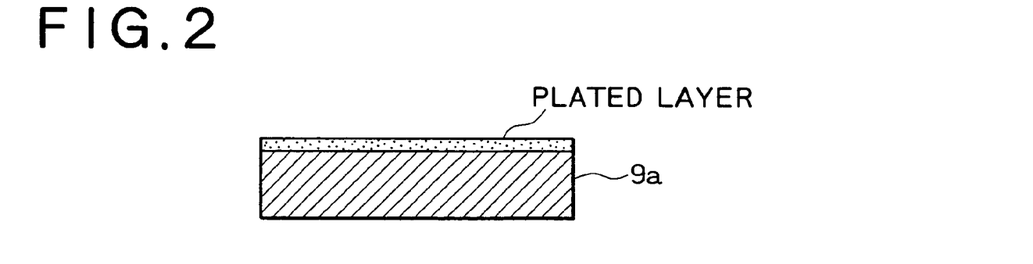
FIG. 2 is an explanatory diagram showing a first manufacturing step for a thrust bearing according to the present invention.
Figure 3:
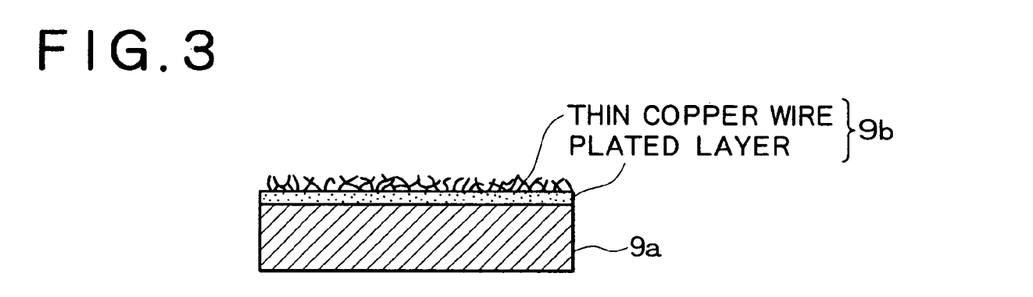
FIG. 3 is an explanatory diagram showing a second manufacturing step for the thrust bearing according to the present invention.
Figure 4:
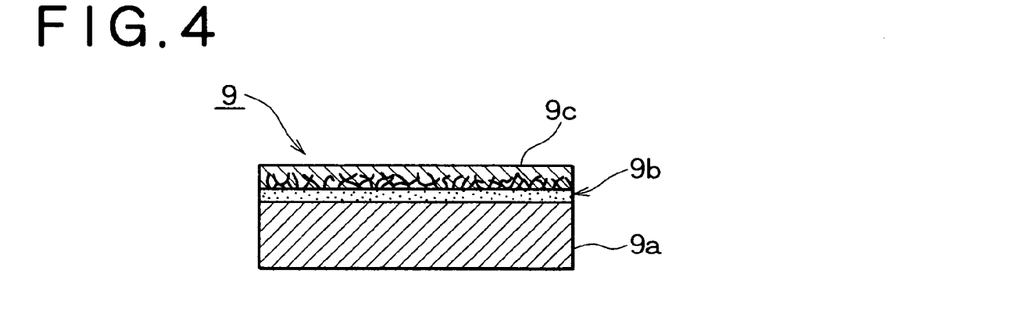
FIG. 4 is an explanatory diagram showing a third manufacturing step for the thrust bearing according to the present invention.
Figure 5:
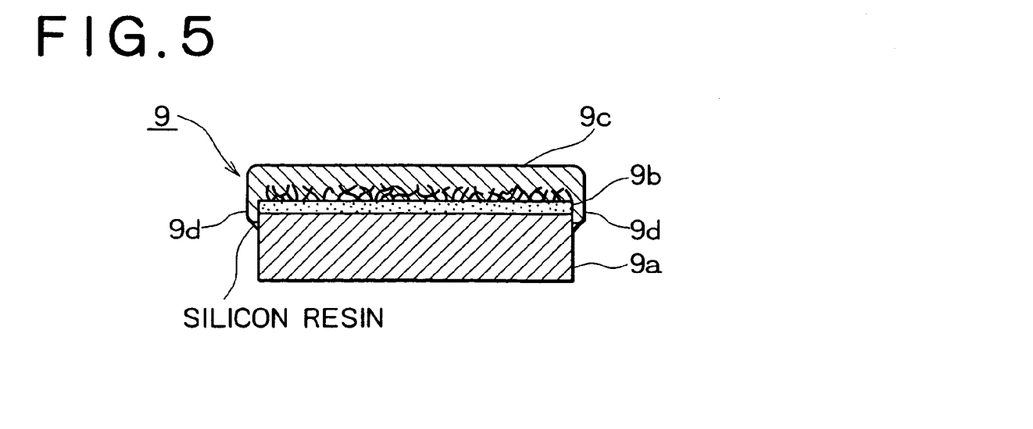
FIG. 5 is a schematic sectional view of the thrust bearing according to the present invention.

With successive reference to the accompanying drawings, a description will be given below about a screw compressor according to a first embodiment of the present invention and thrust bearings which undergo a thrust force of a pair of screw rotors used in the screw compressor. FIG. 1 is a sectional view of a principal portion showing the construction of bearings used in the screw compressor of the first embodiment, FIGS. 2 to 4 are explanatory diagrams showing manufacturing steps for thrust bearings used in the screw compressor, and FIG. 5 is a schematic sectional view of the thrust bearings.

In FIG. 1, the reference numeral 1 denotes a screw compressor having bearings according to a first embodiment of the present invention. The screw compressor 1 is provided with a casing 2. A pair of female and male screw rotors 3, 4 meshed with each other are housed within the casing 2. Of the pair of female and male screw rotors 3, 4, one screw rotor 3 is rotated by a motor (not shown), while the other screw rotor 4 is rotated following the rotation of the one screw rotor 3. Rotor shafts 3a and 4a located on both sides of screws of the pair of female and male screws 3, 4 are supported by radial bearings 7. The radial bearings 7 are fitted into bearing compartments formed by bearing cases 5 and 6 which are clamped with bolts to open ends of the casing 2. Disc-like thrust members 8 are keyed to the outsides of the radial bearings 7 on the rotor shafts 3a and 4a of one (the left one in FIG. 1) of the pair of female and male screw rotors 3, 4. In other words, the disc-like thrust members 8 are further than the radial bearings 7 from the pair of female and male screw rotors 3, 4.

Further, thrust bearings 9 which are in sliding contact with surfaces of the thrust members 8 are disposed on both sides of the thrust members 8. The thrust bearings 9 which are in sliding contact with surfaces of the thrust members 8 on the side of the radial bearings 7 are supported by being fitted in recesses of first bearing holders 10 having flange portions which are clamped with bolts to an end face of the bearing case 5. On the other hand, the thrust bearings 9 which are in sliding contact with surfaces of the thrust members 8 on the side opposite to the radial bearings 7 are supported by being fitted in recesses of second bearing holders 11 having flange portions which are clamped with bolts superimposedly onto the flange portions of the first bearing holders 10.

The first and second bearing holders 10, 11 severally comprise a bearing holder body bolted to the end face of the bearing case 5 and a bearing support member bolted to the bearing holder body and having a recess for fitting therein of the associated thrust bearing 9.

Next, with successive reference to FIGS. 2 to 5, the construction of each thrust bearing 9 will now be described. Reference will be made to an example in which the slide layer as the slide member of each thrust bearing 9 is formed of polytetrafluoroethylene (hereinafter referred to as "PTFE") resin. First, as shown in FIG. 2, a surface of a backing strip 9a made of iron is plated with a metal, e.g., copper, of a lower melting point than iron("copper plating or plated" hereinafter.) Next, as shown in FIG. 3, plural short copper wires are scattered on the copper-plated surface, followed by heating until slight melting of the copper, allowing the copper wires to be fused to the copper-plated surface to form an intermediate layer 9b. Then, the backing strip 9a thus formed with the intermediate layer 9b is heated to a melting temperature of PTFE resin and a PTFE resin plate is pressed down onto the intermediate layer 9b by means of a press. As a result of a so-called anchoring effect the PTFE resin plate is bonded onto the intermediate layer 9b to form a resin layer 9c. In this way there is obtained a thrust bearing 9 constituted by a three-layer slide member.

In the above construction, the intermediate layer 9b is exposed to a side face of the thrust bearing 9. Therefore, if a component which corrodes copper, such as ammonia, is contained in a gas or in a bearing lubricating oil, the intermediate layer 9b in the thrust bearing 9 is corroded during operation of the screw compressor 1. Due to the corrosion of the intermediate layer 9b by ammonia component, the bonding force between the intermediate layer 9b and the resin layer 9c becomes weaker and there arises a fear that the resin layer 9c may peel with consequent damage of the thrust bearing 9.

In the first embodiment of the present invention, for preventing corrosion of the intermediate layer 9b which causes peeling of the resin layer 9c, end portions of the resin layer 9c are extended along side faces of the thrust bearing 9 to form corrosion preventing layers 9d which cover the intermediate layer 9b, as shown in FIG. 5. In this case, a slight gap may be formed between the end of each corrosion preventing layer 9d and the associated side face of the thrust bearing 9, so it is preferable that silicon resin or the like be applied to the end portion of each corrosion preventing layer 9d.

According to the first embodiment of the present invention, since the intermediate layer 9b of the thrust bearing 9 is covered with the corrosion preventing layers 9d, there is no fear of entry of gas and lubricating oil into the disposed portion of the intermediate layer 9b. Therefore, even if a component which corrodes copper, such as ammonia, is contained in the gas or in the lubricating oil, there is no fear of corrosion of the intermediate layer 9b during operation of the screw compressor 1.

Thus, according to the first embodiment of the present invention, since there is no fear of damage of the thrust bearing 9 caused by peeling of the intermediate layer 9b, the frequency of repair of the screw compressor 1 decreases and the rate of operation of the screw compressor 1 is improved. Additionally, there can be obtained such an excellent effect as the maintenance cost is reduced.

A second embodiment of the present invention will now be described with reference to FIG. 6 which is a schematic sectional view of a thrust bearing. As to the construction of the screw compressor, it is the same as in the first embodiment described above, so a description will be given only about the construction of the thrust bearing according to this second embodiment and explanations of other constructional portions will be omitted.

Figure 6:
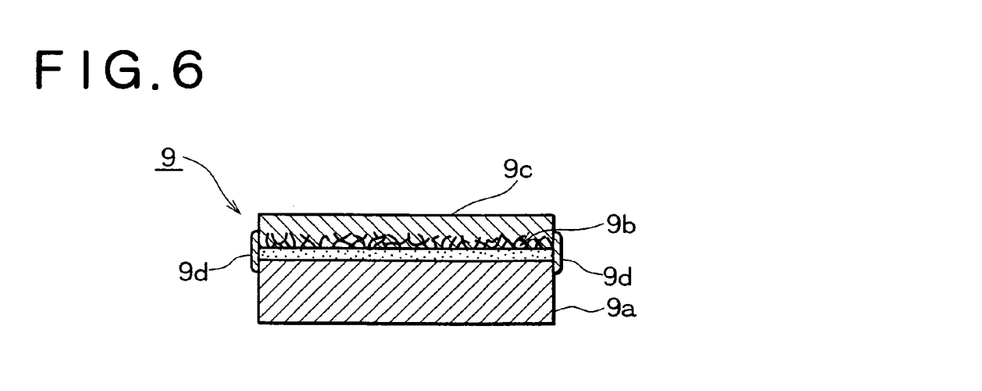
FIG. 6 is a schematic sectional view of another thrust bearing according to the present invention.

In the thrust bearing 9 shown in FIG. 6, corrosion preventing layers 9d are formed by compression bonding the same PTFE resin as the resin layer 9c to side faces of the thrust bearing 9 over a somewhat wider range than the portion where the intermediate layer 9b is positioned. The corrosion preventing layers 9d cover the intermediate layer 9b.

According to this second embodiment of the present invention of the present invention, since the intermediate layer 9b in the thrust bearing 9 is covered with the corrosion preventing layers 9d formed by compression bonding of the PTFE resin, there is no fear of entry of the gas and lubricating oil into the portion where the intermediate layer 9b is disposed. Therefore, it is possible to obtain the same effect as in the first embodiment.

A third embodiment of the present invention will now be described with reference to FIG. 7 which is a schematic sectional view of a thrust bearing. As to the construction of the screw compressor, it is the same as in the first embodiment, so a description will be given only about the construction of the thrust bearing and explanations of other constructional portions will be omitted.

Figure 7:
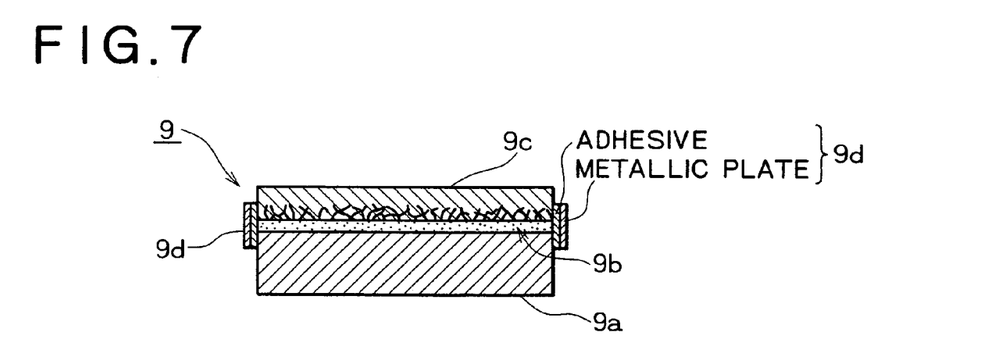
FIG. 7 is a schematic sectional view of still another thrust bearing according to the present invention.

In the thrust bearing 9 shown in FIG. 7, an adhesive, which is, for example, composed of epoxy resin, with a metallic plate bonded thereto, is bonded to side faces of the thrust bearing 9 over a somewhat wider range on both backing strip 9a and resin layer 9c than the portion where the intermediate layer 9b is positioned, to form corrosion preventing layers 9d each comprising the adhesive and the metallic plate. The corrosion preventing layers 9d cover the intermediate layer 9b.

According to this third embodiment of the present invention, since the intermediate layer 9b in the thrust bearing 9 is covered with the corrosion preventing layers 9d each comprising the adhesive and the metallic plate, there is no fear of entry of the gas and lubricating oil into the portion where the intermediate layer 9b is disposed. Therefore, it is possible to obtain the same effect as in the first embodiment.

A fourth embodiment of the present invention will now be described with reference to FIG. 8 which is a schematic view of a thrust bearing. As to the construction of the screw compressor, it is the same as in the first embodiment, so explanations will be given only about the construction of the thrust bearing and explanations of other constructional portions will be omitted.

Figure 8:
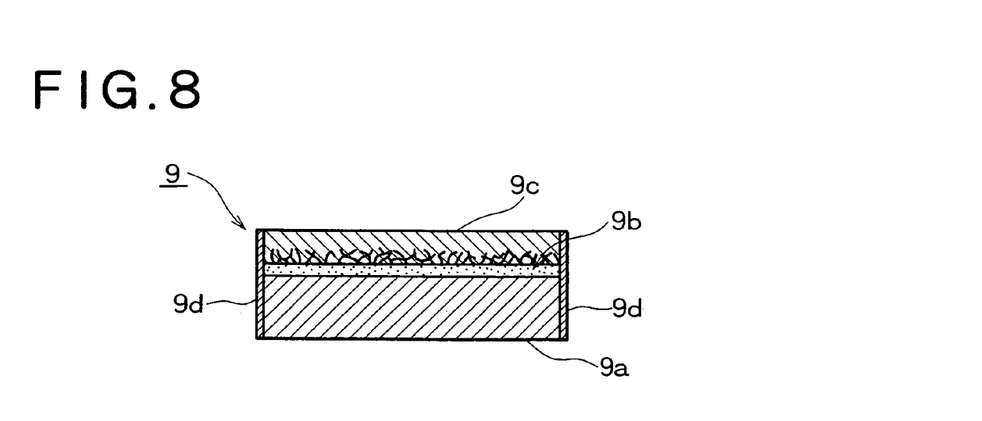
FIG. 8 is a schematic sectional view of still another thrust bearing according to the present invention.

In the thrust bearing 9 shown in FIG. 8, not only the surfaces of both backing strip 9a and resin layer 9c in the thrust bearing 9 are masked, but also the thrust bearing 9 is set within a vacuum deposition vessel to form corrosion preventing layers 9d by vapor-deposited metallic films on side faces of the thrust bearing 9. The corrosion preventing layers 9d cover the intermediate layer 9b. It suffices for the vapor-deposited films to have a thickness of, for example, 50 □m or so.

According to this fourth embodiment of the present invention, since the intermediate layer 9b in the thrust bearing 9 is covered with the corrosion preventing layers 9d formed by vapor-deposited metallic films, there is no fear of entry of the gas and lubricating oil into the disposed portion of the intermediate layer 9b. Therefore, it is possible to obtain the same effect as in the first embodiment. Although in this fourth embodiment the corrosion preventing layers 9d are formed by the vapor-deposited metallic films, corrosion preventing layers of aluminum or chromium alloy films may be formed by sputtering for example.

In the above embodiments the PTFE resin is used as the material of the resin layer 9c which serves as a slide member in the thrust bearing 9. However, as the material of the resin layer 9c there may be used, for example, polyetheretherketone (PEEK) which is superior in abrasion resistance and low in frictional coefficient at the time of start-up. No limitation is made to the resin layer 9c formed of PTFE resin. Reference has been made above to an example in which the intermediate layer 9b is made up of a copper plated layer and plural short copper wires fused to the copper plated layer. However, the present invention is also applicable, for example, to the conventional plural-layer slide member having a porous intermediate layer. No limitation is made to the construction of the intermediate layer used in the above embodiments.

Figure 9:
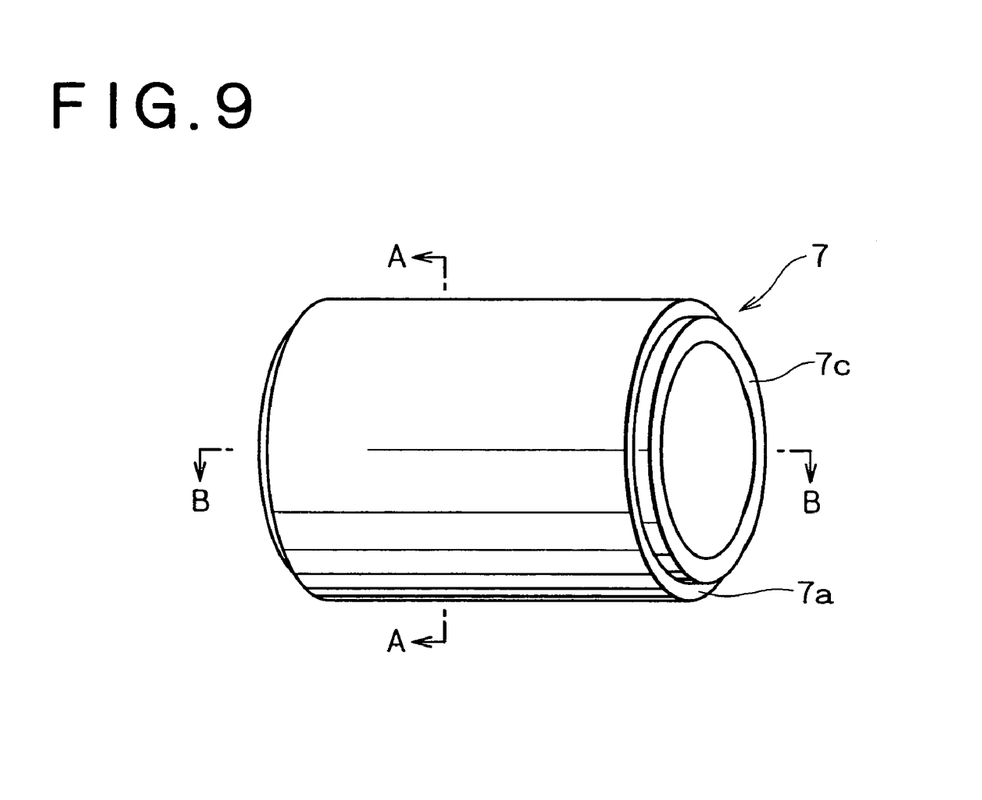
FIG. 9 is a schematic perspective view of a radial bearing according to the present invention.
Figure 10:
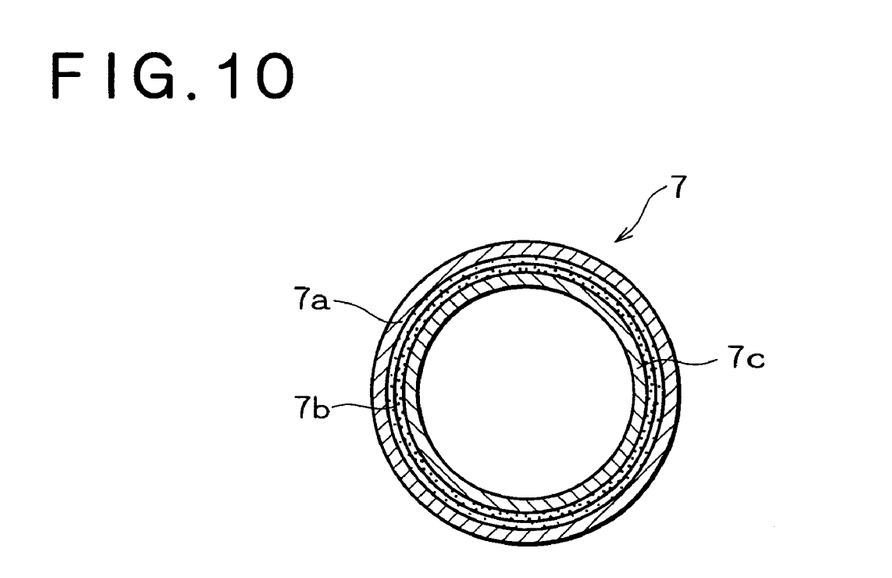
FIG. 10 is a schematic sectional view of the radial bearing according to the present invention as seen in the direction of arrows A—A in FIG. 9.
Figure 11:
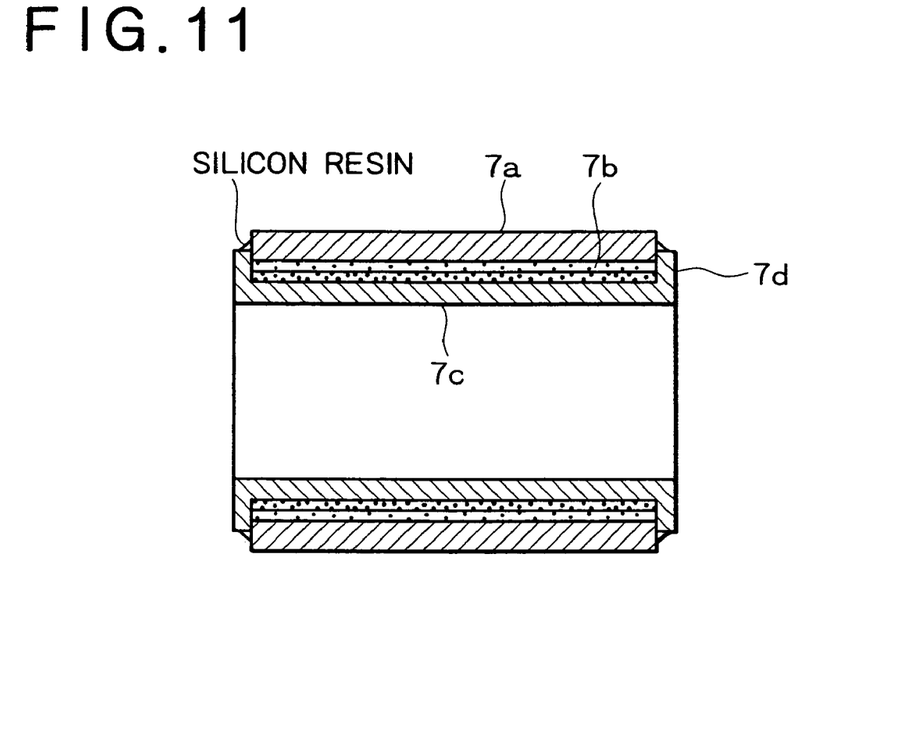
FIG. 11 is a schematic sectional view of the radial bearing according to the present invention as seen in the direction of arrows B—B in FIG. 9.

Although reference has been made to thrust bearings as bearings according to the present invention and screw compressors using such thrust bearings have been shown, no limitation is made to the thrust bearings, and the present invention is also applicable to radial bearings. FIGS. 9 to 11 illustrate a radial bearing 7 according to a fifth embodiment of the present invention, of which FIG. 9 is a schematic perspective view of the radial bearing 7, FIG. 10 is a schematic sectional view as seen from the direction of arrows A—A in FIG. 9, and FIG. 11 is a schematic sectional view as seen from the direction of arrows B—B in FIG. 9.

As shown in FIGS. 10 and 11, like the thrust bearing 9 described above, the radial bearing 7 according to this fifth embodiment of the present invention is constituted by a three-layer slide member and is formed in a generally cylindrical shape. As shown in FIG. 1, the radial bearing 7 is fitted on each of rotor shafts 3a, 4a located on both sides of the screw of the screw rotors 3, 4. The radial bearing 7 is made up of a backing strip 7a made of iron or the like and located at outermost position, an intermediate layer 7b composed of a metal of a lower melting point than the backing strip 7a (e.g., copper) and located inside of the backing strip 7a, and a resin layer 7c formed inside the intermediate layer 7b and having a portion which is in sliding contact with the associated rotor shafts 3a, 4a. Further, as shown in FIGS. 9 and 11, the intermediate layer 7b is covered with the corrosion preventing layers 7d. The resin layer 7c is extended from its ends so as to run along side faces of the radial bearing 7 to form the corrosion preventing layers 7d.

Thus, there is no fear of entry of the gas and the lubricating oil into the portion where the intermediate layer 7b is disposed. Even if a component which corrodes the intermediate layer 7b is contained in the gas or the lubricating oil, the intermediate layer 7b is not corroded.

Figure 12:
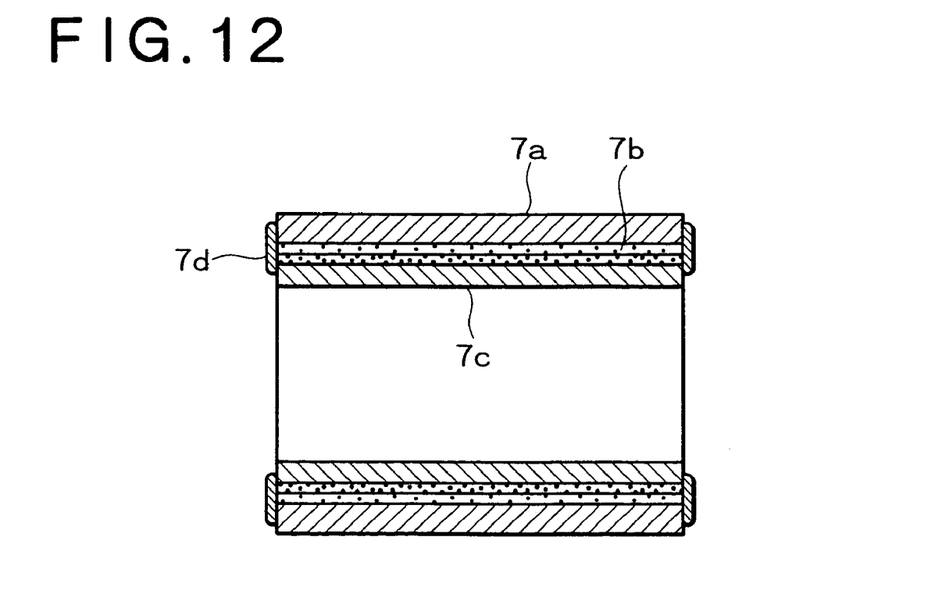
FIG. 12 is a schematic perspective view of another radial bearing according to the present invention.

FIG. 12 is a schematic sectional view of a radial bearing according to a sixth embodiment of the present invention. In this radial bearing 7, corrosion preventing layers 7d are formed by compression-bonding the same resin as the resin of the resin layer 7c to side faces of the radial bearing 7 over a slightly wider range than the portion where the intermediate layer 7b is positioned.

Figure 13:
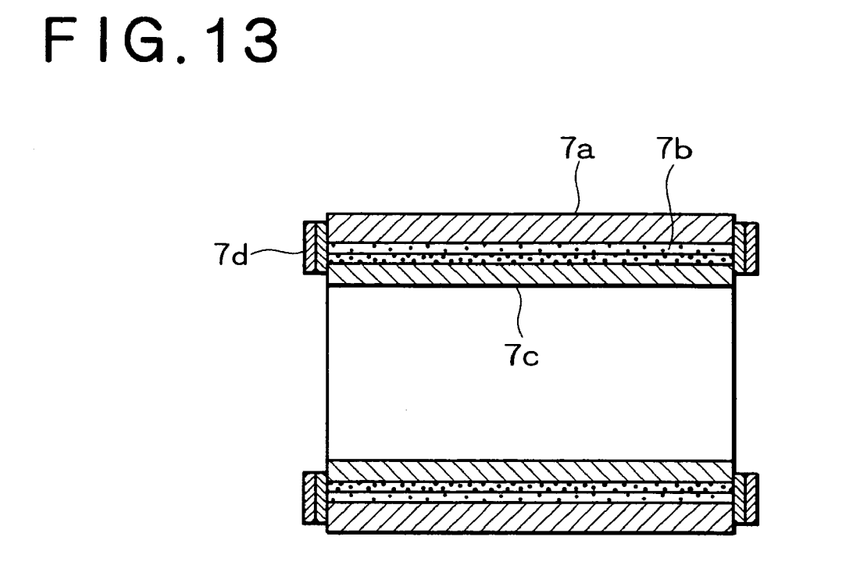
FIG. 13 is a schematic sectional view of still another radial bearing according to the present invention.

FIG. 13 is a schematic sectional view of a radial bearing according a seventh embodiment of the present invention. In this radial bearing 7, an adhesive, with an annular metallic plate bonded thereto, is bonded to side faces of the radial baring 7 over a slightly wider range on the backing strip 7a and the resin layer 7c than the portion where the intermediate layer 7b is positioned. Thus, there are formed corrosion preventing layers 7d each comprising the adhesive and the metallic plate.

Figure 14:
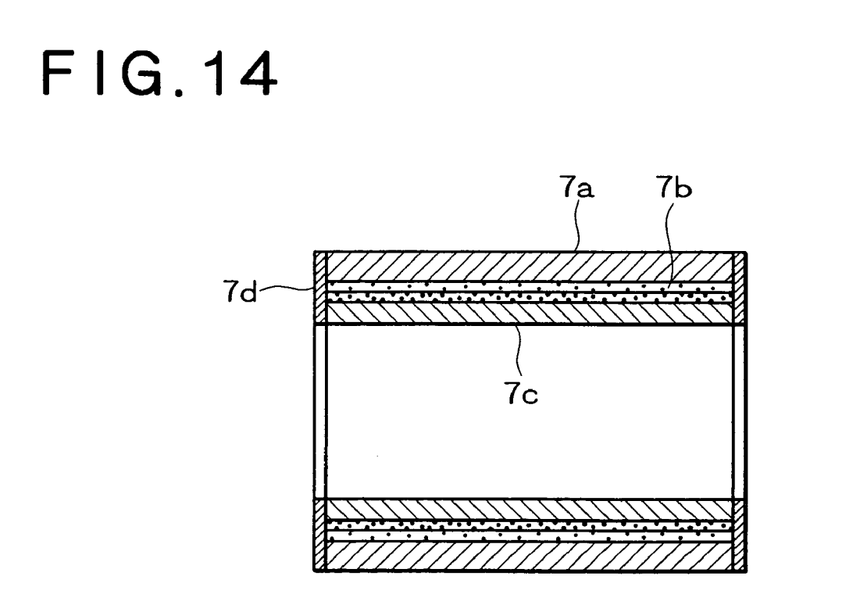
FIG. 14 is a schematic sectional view of still another radial bearing according to the present invention.

FIG. 14 is a schematic sectional view of a radial bearing according to an eighth embodiment of the present invention. In this radial bearing 7, corrosion preventing layers 7d each composed of a vapor-deposited metallic film are formed on side faces of the radial bearing 7.

Thus, also in the case where the bearing according to the present invention is applied to the radial bearing, corrosion of the intermediate layer 7b is prevented by forming the corrosion preventing layers 7d and it is possible to obtain the same effect as in the case where the present invention is applied to the thrust bearing. In the case of the radial bearings of the above fifth to eighth embodiments, an intermediate layer is formed on a plate-shaped backing strip and a resin layer is pressed onto the intermediate layer by means of a press to constitute the same plural-layer slide member as in the thrust bearing. Then, this plural-layer slide member is bent into a cylindrical shape and opposed end faces are bonded to each other. The radial bearings in question are fabricated through these steps.

The invention claimed is:

1. A bearing comprising:
   a slide member, said slide member comprising a resin layer, a backing strip, and an intermediate layer which bonds said resin layer and said backing strip to each other; and
   a corrosion preventing layer formed on each side face of said intermediate layer to prevent corrosion of the intermediate layer.

2. The bearing according to claim 1, wherein said corrosion preventing layer is formed of the same material as the material of said resin layer.

3. The bearing according to claim 1, wherein said corrosion preventing layer is a resin layer bonded to both said resin layer and said backing strip.

4. The bearing according to claim 1, wherein said corrosion preventing layer comprises a resin bonded to both said resin layer and said backing strip and a metal bonded to said resin.

5. The bearing according to claim 1, wherein said corrosion preventing layer is a metallic film formed by vacuum deposition or sputtering.

6. A screw compressor comprising:
a screw rotor, said screw rotor comprising a pair of female and male screw rotors meshed with each other;
a casing for housing said pair of screw rotors therein;
a disc-like thrust member fitted on one of rotor shafts of each of the pair of screw rotors; and
thrust bearings disposed at positions sandwiching said thrust member, said thrust bearings being in sliding contact with a slide surface of said thrust member and undergoing a thrust force transmitted from said screw rotor to the thrust member, said thrust bearings each comprising:
a slide member, the slide member comprising a resin layer, a backing strip, and an intermediate layer which bonds said resin layer and said backing strip to each other; and
a corrosion preventing layer formed on each side face of said intermediate layer to prevent corrosion of the intermediate layer.

7. The screw compressor according to claim 6, wherein said corrosion preventing layer is formed of the same material as the material of said resin layer.

8. The screw compressor according to claim 6, wherein said corrosion preventing layer is a resin layer bonded to both said resin layer and said backing strip.

9. The screw compressor according claim 6, wherein said corrosion preventing layer comprises a resin bonded to both said resin layer and said backing strip and a metal bonded to said resin.

10. The screw compressor according to claim 6, wherein said corrosion preventing layer is a metallic film formed by vacuum deposition or sputtering.

11. A screw compressor comprising:
a screw rotor, said screw rotor comprising a pair of female and male screw rotors meshed with each other; a casing for housing said pair of screw rotors therein; and
radial bearings which are in sliding contact with rotor shafts of said pair of screw rotors and which undergo a radial force transmitted thereto from said rotor shafts, said radial bearings each comprising:
a slide member, said slide member comprising a resin layer, a backing strip, and an intermediate layer which bonds said resin layer and said backing strip to each other; and
a corrosion preventing layer formed on each side face of said intermediate layer to prevent corrosion of the intermediate layer.

12. The screw compressor according to claim 11, wherein said corrosion preventing layer is formed of the same material as said resin layer.

13. The screw compressor according to claim 11, wherein said corrosion preventing layer is a resin bonded to both said resin layer and said backing strip.

14. The screw compressor according to claim 11, wherein said corrosion preventing layer comprises a resin bonded to both said resin layer and said backing strip and a metal bonded to said resin.

15. The screw compressor according to claim 11, wherein said corrosion preventing layer is a metallic film formed by vacuum deposition or sputtering.

16. The bearing according to claim 1, wherein said intermediate layer is a porous intermediate layer.

17. The screw compressor according to claim 6, wherein said intermediate layer is a porous intermediate layer.

18. The screw compressor according to claim 11, wherein said intermediate layer is a porous intermediate layer.

19. The bearing according to claim 16, wherein said porous intermediate layer is formed of a material which is susceptible to corrosion by ammonia.

20. The screw compressor according to claim 17, wherein said porous intermediate layer is formed of a material which is susceptible to corrosion by ammonia.

21. The screw compressor according to claim 18, wherein said porous intermediate layer is formed of a material which is susceptible to corrosion by ammonia.

* * * * *

UNITED STATES PATENT AND TRADEMARK OFFICE
CERTIFICATE OF CORRECTION

PATENT NO.       : 7,144,235 B2                                             Page 1 of 1
APPLICATION NO.  : 10/861462
DATED            : December 5, 2006
INVENTOR(S)      : Yoshimura et al.

It is certified that error appears in the above-identified patent and that said Letters Patent is hereby corrected as shown below:

On the title page, Item (73), the Assignee Information in incorrect. Item (73) should read:

-- (73)   Assignee:   **Kabushiki Kaisha Kobe Seiko Sho
                      (Kobe Steel, Ltd.)** Kobe (JP)--

Signed and Sealed this

Twentieth Day of February, 2007

JON W. DUDAS
*Director of the United States Patent and Trademark Office*